(12) United States Patent
Lin et al.

(10) Patent No.: US 11,687,420 B2
(45) Date of Patent: Jun. 27, 2023

(54) CONTROL METHOD FOR ERROR HANDLING IN A CONTROLLER, STORAGE MEDIUM THEREFOR, CONTROLLER AND STORAGE DEVICE

(71) Applicant: SK hynix Inc., Icheon-si (KR)

(72) Inventors: Wen Jyh Lin, Zhubei (TW); Yun Chih Huang, Zhubei (TW); Fu Hsiung Lin, Zhubei (TW)

(73) Assignee: SK hynix Inc., Icheon-si (KR)

( * ) Notice: Subject to any disclaimer, the term of this patent is extended or adjusted under 35 U.S.C. 154(b) by 30 days.

(21) Appl. No.: 17/563,641

(22) Filed: Dec. 28, 2021

(65) Prior Publication Data
US 2022/0276939 A1 Sep. 1, 2022

(30) Foreign Application Priority Data
Feb. 26, 2021 (TW) .................................. 110107090

(51) Int. Cl.
*G06F 11/20* (2006.01)
(52) U.S. Cl.
CPC ........ *G06F 11/2005* (2013.01); *G06F 11/201* (2013.01); *G06F 2201/85* (2013.01)
(58) Field of Classification Search
CPC . G06F 11/2005; G06F 11/201; G06F 2201/85
See application file for complete search history.

(56) References Cited

U.S. PATENT DOCUMENTS

| 5,084,816 A * | 1/1992 | Boese ................. G06F 11/2046 714/E11.015 |
| 7,106,742 B1 * | 9/2006 | Frisch .................. H04L 1/0061 370/244 |
| 2013/0262892 A1 | 10/2013 | Radulescu |
| 2014/0143588 A1 | 5/2014 | Leinonen |

(Continued)

FOREIGN PATENT DOCUMENTS

| CN | 101682580 A | 3/2010 |
| CN | 102648612 A | 8/2012 |

(Continued)

*Primary Examiner* — Matthew M Kim
*Assistant Examiner* — Indranil Chowdhury
(74) *Attorney, Agent, or Firm* — William Park & Associates Ltd.

(57) ABSTRACT

A control method for error handling in a controller, storage medium therefor, controller, and storage device. The controller for use in a first device is capable of linking to a second device according to an interconnection protocol. The control method includes the following steps: handling a first error information by transmitting a negative acknowledgement control (NAC) message to the second device according to the interconnection protocol through the controller, wherein the first error information indicates a first error occurring while the controller performs data reception according to a protocol layer of the interconnection protocol; and setting error handling status data to indicate that error handling is asserted for the first error information so that the controller does not handle sequence number errors occurring after the first error until the error handling status data is set to indicate that the error handling is de-asserted.

18 Claims, 9 Drawing Sheets

(56) References Cited

U.S. PATENT DOCUMENTS

| | | | |
|---|---|---|---|
| 2016/0170824 A1* | 6/2016 | Hamo | H04L 1/1671 |
| | | | 714/763 |
| 2017/0264519 A1 | 9/2017 | Kanou | |
| 2019/0026179 A1* | 1/2019 | Araki | G06F 11/142 |
| 2019/0146934 A1 | 5/2019 | Rosensprung et al. | |
| 2022/0129179 A1* | 4/2022 | Choi | G06F 3/0635 |
| 2022/0283622 A1* | 9/2022 | Wang | G06F 1/3275 |
| 2023/0056001 A1* | 2/2023 | Lin | G06F 11/3034 |

FOREIGN PATENT DOCUMENTS

| | | | | |
|---|---|---|---|---|
| EP | 0310360 A2 * | 4/1989 | | H04L 11/00 |
| EP | 0447054 A2 * | 9/1991 | | H04L 29/06 |
| EP | 2391042 B1 * | 7/2015 | | H04L 1/1858 |
| KR | 1020160073295 A | 6/2016 | | |

* cited by examiner discarding second error information indicating a sequence number error according to the error handling status data indicating that error handling is asserted so that the controller transmits no NAC message due to the second error information — S30

FIG.5B setting the error handling status data to indicate that the error handling is deasserted when a data message is received to resolve the first error — S40

FIG.5C

CONTROL METHOD FOR ERROR HANDLING IN A CONTROLLER, STORAGE MEDIUM THEREFOR, CONTROLLER AND STORAGE DEVICE

CROSS-REFERENCE TO RELATED APPLICATION

The present application claims priority under 35 U.S.C. § 119(a) to Taiwanese Patent Application No. 110107090 filed on Feb. 26, 2021, in the Taiwan Intellectual Property Office, which is incorporated herein by reference in its entirety.

BACKGROUND OF THE INVENTION

1. Field of the Invention

The present disclosure relates to an electronic device, and in particular to a control method for error handling in a controller, a storage medium therefor, a controller, and a storage device.

2. Description of the Related Art

Nowadays the amount of data generated and processed in mobile devices (e.g., smartphones, tablet computers, multimedia devices, wearable devices, and other computing devices) continues to increase, chips in the mobile device need further evolution to reach the goals of higher transmission speed, low-power consumption operation, expandability, support for multitasking, and ease of adoption.

Therefore, the Mobile Industry Processor Interface (MIPI) Alliance has developed an interconnection interface technique capable of reaching the aforementioned goals, for example, the MIPI M-PHY regulation related to the physical layer and the MIPI UniPro regulation related to Unified Protocol (UniPro). On the other hand, by using the MIPI M-PHY regulation and the MIPI UniPro regulation, Joint Electron Device Engineering Council (JEDEC) has launched a next-generation high-performance non-volatile memory standard called Universal Flash Storage (UFS), which can achieve high-speed transmission at the level of one billibit per second and low-power consumption operation, and has the functions and scalability required by the high-end mobile system, and thus can be quickly adopted by the industry.

When a technical person develops products related to chips, electronic modules, or electronic devices according to these interconnection interface techniques, they need to ensure the function and operation of products can comply with the regulation. For example, the system implemented according to the UFS standard, for example, includes a computing device, and a non-volatile memory storage device, the computing device and the storage device play the roles of a local host and a remote device respectively. The host and the storage device build a two-way link. Error handling requires implementing according to the UniPro standard, the part finding the error should actively transmit informed signals indicating errors occurring at the other device, and thus triggers the other device to transmit data again.

BRIEF SUMMARY OF THE INVENTION

The embodiments provide a control technique for error occurring of the interconnection interface, wherein the error handling status information is set in the process of error occurring of the interconnection interface, and avoids delays due to repeatedly transmitting informed signals indicating error occurring according to the error handling status information, and is thus helpful to improve the effectiveness of error handling of the interconnection interface. Various embodiments are provided according to the control techniques as follows, for example, the control method for error handling in a controller, storage medium therefor, controller, and storage device.

The embodiment provides a control method for error handling in a controller, the controller for use in a first device capable of linking to a second device according to an interconnection protocol, the control method comprising the following steps: handling first error information by transmitting a negative acknowledgement control (NAC) message to the second device according to the interconnection protocol through the controller, wherein the first error information indicates a first error occurring while the controller performs data reception according to a protocol layer of the interconnection protocol; and setting error handling status data to indicate that error handling is asserted for the first error information so that the controller does not handle sequence number errors occurring after the first error until the error handling status data is set to indicate that the error handling is de-asserted.

In some embodiments of the control method, the method further comprises: discarding second error information indicating a sequence number error according to the error handling status data indicating that error handling is asserted so that the controller transmits no NAC message due to the second error information.

In some embodiments of the control method, the method further comprises: setting the error handling status data to indicate that the error handling is de-asserted when a data message is received to resolve the first error.

The embodiment further provides a storage medium, which stores program code used to make a storage device perform at least one or its combination of the aforementioned control method for error handling in the controller.

The embodiment further provides a controller, the controller for use in a first device capable of linking to a second device according to an interconnection protocol, the controller comprising: an error handling module and an error suppression module. The error handling module is configured to handle first error information by transmitting a negative acknowledgement control (NAC) message to the second device according to the interconnection protocol, wherein the first error information indicates a first error occurring while the controller performs data reception according to a protocol layer of the interconnection protocol. An error suppression module is configured to set error handling status data to indicate that error handling is asserted for the first error information so that the controller does not handle sequence number errors occurring after the first error until the error handling status data is set to indicate that the error handling is de-asserted.

In some embodiments, the error suppression module is further configured to discard second error information indicating a sequence number error according to the error handling status data indicating that the error handling is asserted so that the error handling module transmits no NAC message due to the second error information.

In some embodiments, the error suppression module is further configured to set the error handling status data to indicate that the error handling is de-asserted when a data message is received to resolve the first error.

The embodiment further provides a storage device, capable of linking to a host according to an interconnection protocol, the storage device comprising: a non-volatile memory and a memory controller. The memory controller, coupled to the non-volatile memory, for controlling data access to the non-volatile memory, wherein the memory controller is configured to perform a plurality of operations comprising: handling first error information by transmitting a negative acknowledgement control (NAC) message to the second device according to the interconnection protocol, wherein the first error information indicates a first error occurring while the memory controller performs data reception according to a protocol layer of the interconnection protocol; and setting error handling status data to indicate that error handling is asserted for the first error information so that the memory controller does not handle sequence number errors occurring after the first error until the error handling status data is set to indicate that the error handling is de-asserted.

In some embodiments, the memory controller is configured to further perform: discarding second error information indicating a sequence number error according to the error handling status data indicating that the error handling is asserted so that the error handling module transmits no NAC message due to the second error information.

In some embodiments, the memory controller is configured to further perform: setting the error handling status data to indicate that the error handling is de-asserted when a data message is received to resolve the first error.

In some embodiments, the protocol layer is a Universal Flash Storage InterConnect (UIC) layer.

In some embodiments, the first device is a storage device according to the Universal Flash Storage standard.

In some embodiments, the first device is configured to communicate with the second device in an asymmetry power mode.

Therefore, various embodiments of the control techniques for the error handling of the interconnection interface are provided above, for example, the control method for error handling in a controller, storage medium therefor, controller and storage device. The aforementioned control techniques used for error handling are capable of reducing or avoiding the delay due to repeatedly transmitting informed signals indicating error occurring in the process of error handling of the interconnection interface, and are thus helpful to improve the effectiveness of error handling of the interconnection interface.

BRIEF DESCRIPTION OF THE DRAWINGS

FIG. 5B is a flowchart of an embodiment of a control method for error handling in a controller.

FIG. 5C is a flowchart of an embodiment of a control method for error handling in a controller.

DETAILED DESCRIPTION OF THE INVENTION

To facilitate understanding of the objectives, characteristics and effects of this present disclosure, embodiments together with the attached drawings for the detailed description of the present disclosure are provided.

Various embodiments of the control technique for error handling of the interconnection interface according to the present disclosure are provided as follows, for example, the control method for error handling in a controller, a storage medium therefor, a controller, and a storage device.

Figure 1:
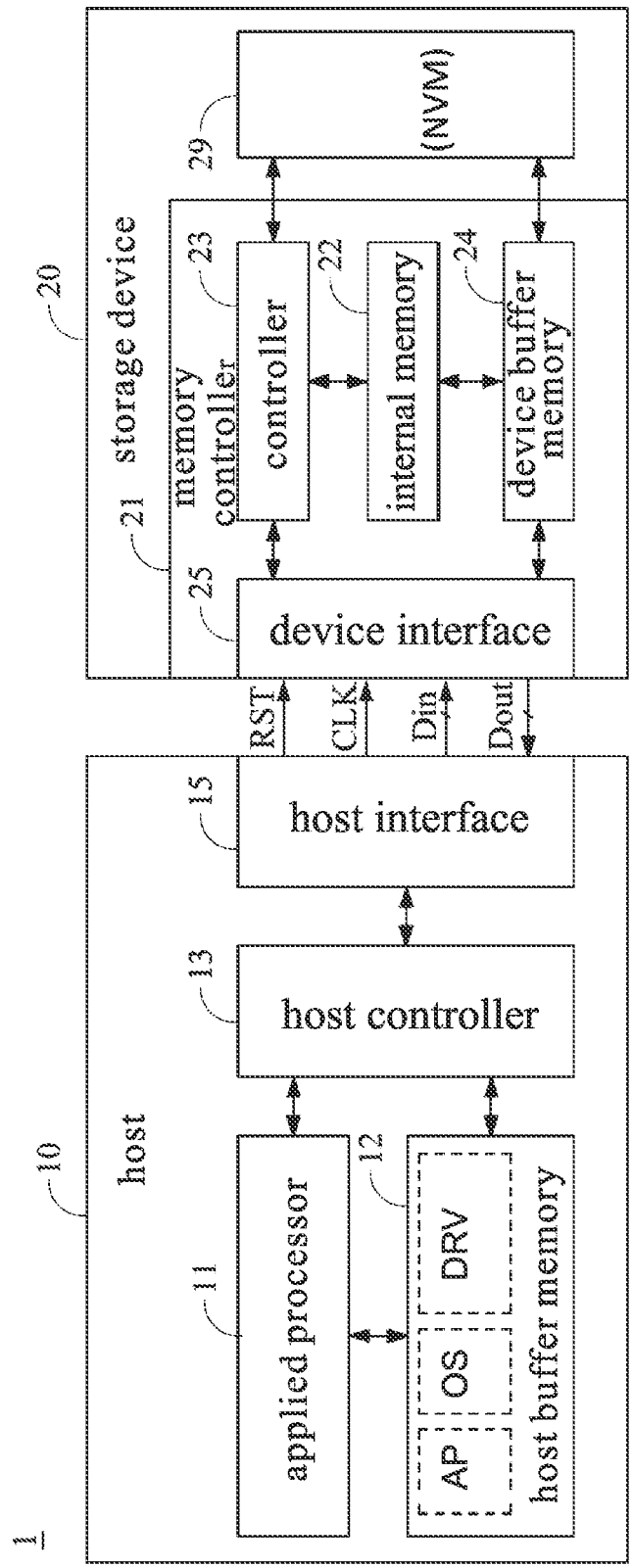
FIG. 1 is a schematic block diagram of a storage system, wherein an embodiment of the control technique for error handling of the interconnection interface according to the present disclosure can be implemented in the storage system.
Figure 2:
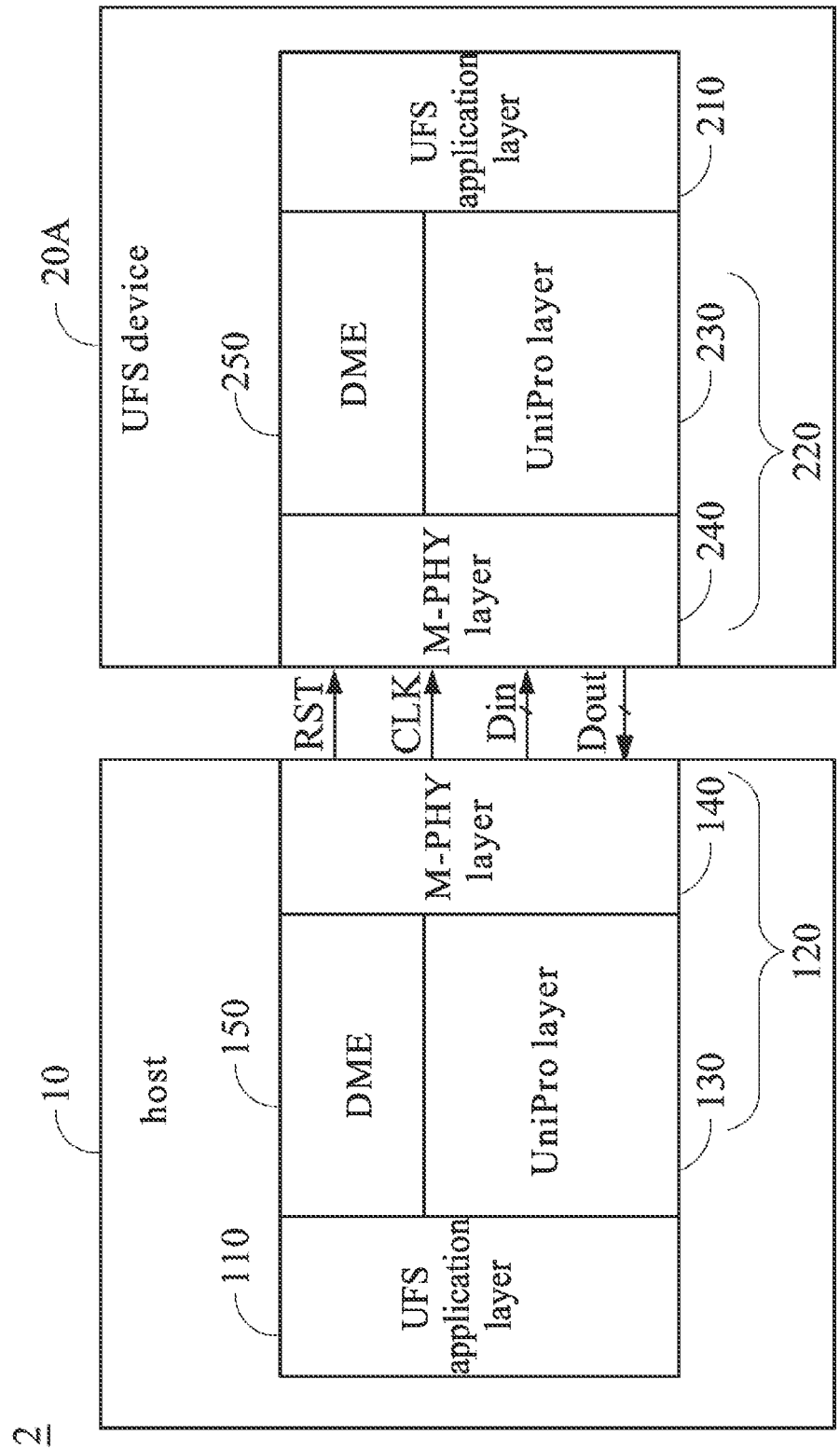
FIG. 2 is a schematic diagram of a multi-layered hierarchical architecture of the storage system according to FIG. 1.
Figure 3:
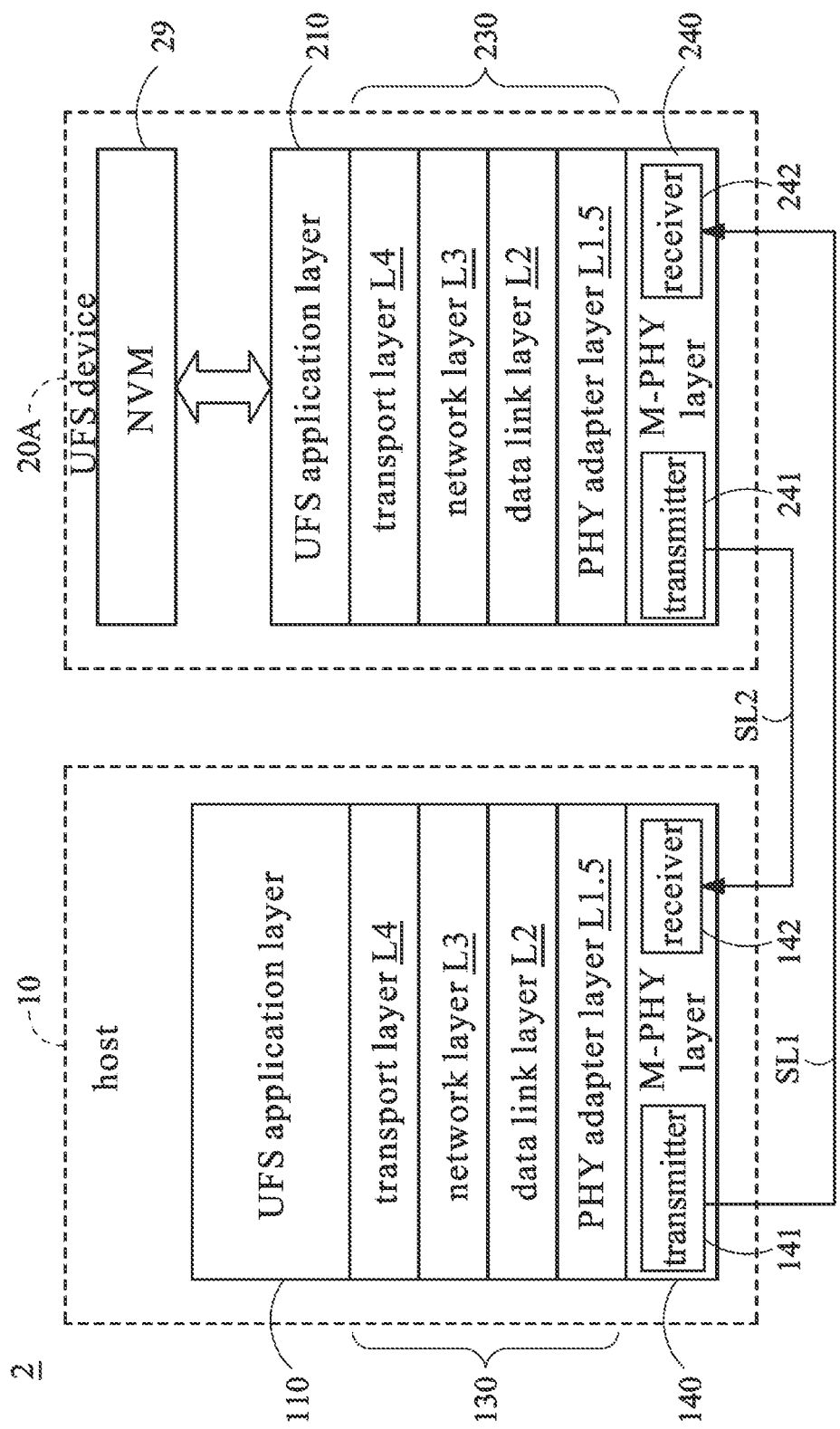
FIG. 3 is a schematic diagram of a hierarchical architecture of the UFS system of FIG. 2.

To facilitate the understanding of the object and effect of the control technique, the scenarios of the various aspects to which the control technique can apply are explained through the following examples of FIG. 1 to FIG. 4. First, FIG. 1 to FIG. 3 are briefly introduced. FIG. 1 illustrates a storage system that can be used to implement an embodiment of the control technique for error handling of the interconnection interface according to the present disclosure. FIG. 2 illustrates a storage system that can implement the storage system of FIG. 1 to comply with the UFS standard, or the UFS system for short, and illustrates the multi-layered hierarchical architecture of the UFS system. FIG. 3 is a schematic diagram of the multi-layered hierarchical architecture of the UFS system of FIG. 2.

The applied scenarios of various aspects are explained in examples of FIG. 1 to FIG. 3.

Referring to FIG. 1, FIG. 1 is a schematic block diagram of the storage system. FIG. 1 illustrates the storage system that can be used to implement an embodiment (this will be described in detail later) of the control technique. As illustrated in FIG. 1, the storage system 1 can include a host 10 and a storage device 20.

The host 10 can include an applied processor 11, a host buffer memory 12, a host controller 13, and a host interface 15. The host 10 can run the operating system (OS) in the host buffer memory 12 through the applied processor 11 and perform the device driver (DRV) and various applications (AP) on the OS. The host buffer memory 12 can be used as the host memory or the high-speed buffer memory of the host 10. The host buffer memory 12 can temporarily store the data provided to the storage device 20. The host buffer memory 12 can also be used as the host memory, used for temporarily storing the OS, the DRV, and the AP. The host 10 can write the data into the storage device 20, or can read the data written in the storage device 20. The applied processor 11 performs the AP to transmit the input/output request used for the data transmission to the storage device 20, or to receive the data from the storage device 20 to the DRV. The input/output request is, for example, the read request, the write request, or the erase request. The DRV can transform the input/output request generated by the AP to the request defined by the protocol regulation and can transmit the transformed request to the host controller 13. The host controller 13 can control the operation related to the storage device 20 in the host 10. For example, the host controller 13 can provide the data stored in the host buffer memory 12 to the storage device 20 through the host interface 15 when the DRV receives the write request. For example, the host controller 13 can receive data from the storage device 20 through the host interface 15 when the DRV receives the read request.

The host interface 15 can couple with a device interface 25 through data lines Din and Dout used for transmitting/receiving data, a reset line (RST) used for transmitting hardware reset signals, a clock line (CLK) used for transmitting data. Data lines Din and Dout can be implemented as multiple pairs, wherein a pair of data lines Din and Dout can be called a lane. The host interface 15 can communicate with the device interface 25 by using at least one interface protocol, the interface protocol is, for example, MIPI, UFS, SCSI, or SCSI(SAS), however, the implementation of the present disclosure is not limited to the aforementioned examples.

The storage device 20 can write the data under the control of the host 10 or provide the written data to the host 10. The storage device 20 can be implemented as an SSD, an MMC, an eMMC, an SD card, or a UFS device, however, the implementation of the present disclosure is not limited to the aforementioned examples.

The storage device 20 can include a memory controller 21 and a non-volatile memory (NVM) 29. The memory controller 21 can control the entire operation of the storage device 20. The memory controller 21 can include an internal memory 22, a controller 23, a device buffer memory 24, and a device interface 25. The internal memory 22 can store various information generated through the operation of the memory controller 21 or the controller 23. The controller 23 can control the write operation, the read operation, or the erase operation of a non-volatile memory 29. The controller 23 can exchange data with the non-volatile memory 29 or the device buffer memory 24 through an address bus or a data bus. The device buffer memory 24 can temporarily store the data which will be stored in the non-volatile memory 29, or temporarily store the data read from the non-volatile memory 29. The device buffer memory 24 can be implemented as volatile memory or a non-volatile memory. The device interface 25 can communicate with the host 15 by using at least one interface protocol, the interface protocol is, for example, MIPI, UFS, SCSI, or SCSI(SAS), however, the implementation of the present disclosure is not limited to the aforementioned examples. The non-volatile memory 29 can perform the write operation of the data, the read operation of the data or the erase operation of the data under the control of the controller 23. The non-volatile memory 29 includes, for example, one or more memory chips.

Referring to FIG. 2, FIG. 2 is a schematic diagram of a multi-layered hierarchical architecture of the storage system according to FIG. 1. FIG. 2 illustrates a storage system that can implement the storage system 1 of FIG. 1 to comply with the UFS standard, or the UFS system 2 for short, wherein the multi-layered hierarchical architecture of the UFS system is illustrated. However, the implementation of the present disclosure is not limited to the aforementioned examples, and it can be applied to various storage systems with multi-layered hierarchical architecture in proper situations. Each layer in FIG. 2 can be implemented as hardware, firmware, or software.

Referring to FIG. 2, the UFS system 2 can include the host 10 and the UFS device 20A. For example, the UFS device 20A can be implemented by using the storage device 20 illustrated in FIG. 1.

The host 10 includes a UFS application layer 110 and a UFS interconnect (UIC) layer 120. The UIC layer 120 includes a MIPI UniPro layer 130 (called "UniPro layer" in the following description) and a MIPI physical (M-PHY) layer 140 (called "M-PHY layer" in the following description), wherein a device management entity (DME) 150 is defined as capable of communicating with the UFS application layer 110, UniPro layer 130 and M-PHY layer 140, further implementing the function related to the integrity of UniPro, for example, control or configuration functions such as power-on, power-off, reset, power mode change, etc.

Similarly, the UFS device 20A includes a UFS application layer 210 and a UFS interconnection layer 220. The UFS interconnection layer 220 includes a UniPro layer 230 and a M-PHY layer 240. The UFS device 20A also correspondingly defines a device management entity (DME) 250.

Each layer of the host 10 can perform the operation the same as each layer of the UFS device 20A or perform the operation similar to each layer of the UFS device 20A.

The UFS application layer 110 (or 210) can run various types of modules required to operate the host 10 (or the UFS device 20A). For example, the UFS application layer 110 can include a UFS command set (UCS) layer, and the UCS layer can manage commands used by the AP, the OS, or the DRV from the host 10 to issue commands to the UFS interconnection layer 120 to read, write, or erase data to the UFS device 20A. Corresponding to the UFS application layer 110 of the host 10, the UFS application layer 210 of the UFS device 20A is implemented by the controller 23 in the storage device 20 as illustrated in FIG. 1, operating read, write or erase data to non-volatile memory 29 after receiving commands from UFS application layer 110 of the host 10.

The DME 150 (or 250) can be used to control or manage the UIC layer 120 (or 220).

The UFS interconnection layer 120 (or 220) can provide service to the UFS application layer 110 (or 210) serving as an upper layer. For example, the UFS interconnection layer 120 (or 220) can generate a UFS protocol information unit (UPIU), which is used for transmitting/receiving data or requesting data packets, or can release the received UPIU.

The M-PHY layer 140 (or 240) can transform the information received from the UniPro layer 130 (or 230) serving as the upper layer according to a predetermined protocol and can transmit the transformed information to the UFS device 20A (or the host 10). In addition, the M-PHY layer 140 (or 240) can transform the information received from the UFS device 20A (or the host 10) according to the predetermined protocol, and can transmit the transformed information to the UniPro layer 130 (or 230) serving as the upper layer.

In an embodiment, the UFS application layer 210 and the UFS interconnection layer 220 can both be implemented in the form of firmware or software, and can be performed or implemented by the controller 23, as described in FIG. 1 or FIG. 2.

Referring to FIG. 3, FIG. 3 is a schematic diagram of a hierarchical architecture of the UFS system of FIG. 2. Take the situation of the UniPro layer 130 being composed of four layers in FIG. 3 as an example. Each layer of the UniPro layer 230 of the UFS device 20A can also be operated and implemented similarly.

As illustrated in FIG. 3, the UniPro layer 130 (or 230) can include a PHY adapter layer L1.5, a data link layer L2, a network layer L3, and a transport layer L4.

The PHY adapter layer L1.5 couples the M-PHY layer (140 or 240) to the data link layer L2. The PHY adapter layer L1.5 can perform bandwidth control, power management between the M-PHY layer and the data link layer L2. While implementing, the M-PHY layer 140 of the host 10 includes a transmitter 141 and a receiver 142, also, the M-PHY layer 240 of the UFS device 20A includes a transmitter 241 and a receiver 242, to perform dual communication.

The data link layer L2 can perform flow control used in data transmission between the host 10 and the UFS device 20A. That is, the data link layer L2 can monitor the data transmission or control the speed of the data transmission. In addition, the data link layer L2 can perform error control based on cyclic redundancy check (CRC). The data link layer L2 can use packets received from the network layer L3 to generate a frame, or can use the frame received from the PHY adapter layer L1.5 to generate packets.

The network layer L3 is used for a routing function of selecting the transmission path for packets received from the transport layer L4.

The transport layer L4 can use commands received from the UFS application layer 110 (or 210) to configure data segments suitable for the protocol, and transmit the data segment to the network layer L3, or can extract commands from packets received from the network layer L3 and transmit the command to the UFS application layer 110 (or 210). The transport layer L4 can use a scheme based on error control of the sequence to ensure the effectiveness of the data transmission.

When a technical person develops products related to chips, electronic modules, or electronic devices according to interconnection interface techniques, for example, the UFS standard, they need to ensure the function and operation of products can comply with the regulation. For example, the system implemented according to the UFS standard includes a computing device and a storage device of non-volatile memory (as the described host 10 and the UFS device 20A of FIG. 2), the host 10 and the UFS device 20A play the roles of a local host and a remote device respectively. The host 10 and the UFS device 20A build a two-way link. According to the UniPro standard, the host 10 and the UFS device 20A both require the mechanism of implementing error handling, for example, implementing the error handling related to the frame in the data link layer L2. A physical mechanism is, for example, a timer that is turned on and checks whether the response is received in a predetermined time when any of the host and the UFS device 20A (or the starting end) transmits the data frame, or the error handling needs to be performed; and whether the data frame is correct or wrong is checked when any of the host and UFS device 20A (or the target end) receives the data frame. When the data frame is correct, then a control frame indicating the data frame being correct is sent to the starting end as the informed signal, for example, an Acknowledgment and Flow Control (AFC) frame. When the data frame is wrong, then the control frame indicating the data frame being wrong is sent to the starting end as the informed signal, for example, a Negative Acknowledgment Control (NAC) frame. When the starting end receives the NAC frame, it triggers the starting end to perform retransmission, which is performing a replay mechanism, for example, the starting end transmits the AFC1, AFC0 frame at first, and then retransmits (continuously transmit) the data frame.

In the UFS system, the UFS transmitter and the UFS receiver operate in an asymmetry power mode (or asymmetry speed). Referring to FIG. 3 again, in this situation, the operating speed of the host transmitter (e.g., the transmitter 141 of the host 10) connected to the device receiver (e.g., the receiver 242 of the UFS device 20A) may be faster than the operating speed of the device transmitter (e.g., the transmitter 241 of the UFS device 20A) connected to the host receiver (e.g., the receiver 142 of the host 10). Assume the sub-link of the host transmitter to the device receiver works in a fast mode, and the sub-link of the device transmitter to the host receiver works in a slow mode, and both sub-links transmit data to each other.

Figure 4:
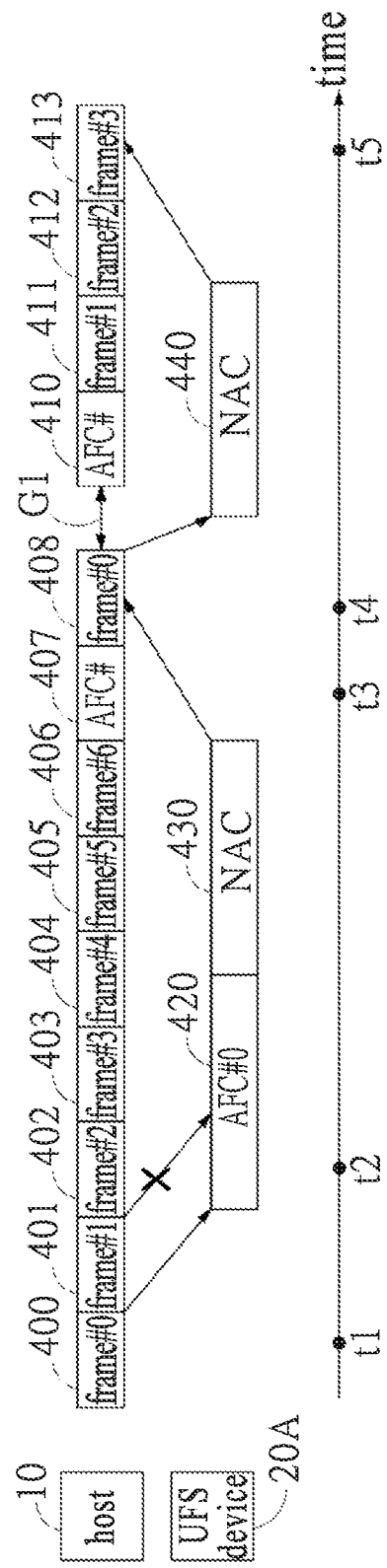
FIG. 4 is a schematic diagram of the host and the UFS device performing error handling in the process of data transmission, wherein the situation of repeatedly informing error is occurring.

When implementing the error handling of the host 10 and the UFS device 20A according to the UniPro standard, the situation of repeatedly error reporting may occur if the host 10 and the UFS device 20A operate in an asymmetry power mode (or asymmetry speed). Referring to FIG. 4, FIG. 4 is the schematic diagram of the host 10 and the UFS device 20A performing error handling during data transmission. For ease of explanation, FIG. 4 illustrates the situation in a simplified way which may occur during the data transmission of the host 10 and the UFS device 20A adopted by the UniPro standard (e.g., version 1.4, 1.8) according to the UFS standard. For example, the upper and the lower blocks of the leftmost side of FIG. 4 represent the host 10 and the UFS device 20A respectively. Referring to FIG. 3 and FIG. 4, in these examples, the host 10 and the UFS device 20A are set to operate in an asymmetry power mode (or asymmetry speed), for example, the sub-link SL1 of the transmitter 141 of the host 10 to the receiver 242 of the UFS device 20A works in a fast mode, and the sub-link SL2 of the transmitter 241 of the UFS device 20A to the receiver 142 of the host 10 works in a slow mode. In FIG. 4, a series of blocks 400-413 of the left side of the host 10 illustrates the host 10 transmitting the frame to the UFS device 20A through the sub-link SL1 with time sequence respectively; in FIG. 4, a series of blocks 420-440 of the left side of the UFS device 20A illustrates the UFS device 20A transmitting the frame to the host 10 through the sub-link SL2 with time sequence respectively. Also, FIG. 4 illustrates the data transmission of the UFS device 20A to the host 10 through the sub-link SL2 being helpful to explain the frame with the situation, for example, informed signals (e.g., the AFC frame or the NAC frame) sent from the UFS device 20A to the host 10, with others being temporarily ignored but will not affect understanding. Also, FIG. 4 omits the schematic diagram of the host 10 and the UFS device 20A receiving the frame. Those ordinarily skilled in the art may understand the meaning of FIG. 4 according to the UniPro standard (e.g., version 1.4, 1.8).

As illustrated in FIG. 4, at the time point t1, the host 10 starts to perform data link (DL) frame transmitting, for example, the frame starts from the sequence number 0, so block 400 in FIG. 4 represents "#0". Then, the UFS device 20A receives "#0", and ensures "#0" is correct after being examined (e.g., based on cyclic redundancy check (CRC) or other suitable judging rules), and thus transmits the AFC frame to the host 10, the AFC frame has the corresponding sequence number "#0" of the frame, and thus block 420 in FIG. 4 represents the AFC frame "AFC #0".

At the time point t2, due to some reasons, "frame #1" (e.g., block 401 illustrates) is damaged (e.g., indicated through a crossing sign below block 401), and lead to the UFS device 20A face Protocol Data Unit (PDU) error. And then, the UFS device 20A starts to perform the transmission of the NAC frame, for example, the NAC frame is represented by block 430, to perform error handling. Meanwhile, the host 10 continues to transmit frames due to the sub-link SL1 being faster. Because the UFS device 20A is performing error handling, "frame #2" to "frame #6" (e.g., blocks 402-406 illustrate) are discarded by the UFS device 20A.

At the time point t3, the host 10 receives the first NAC frame from the UFS device 20A, and stops transmitting the frame at the proper cut point. In this situation, the host 10 stops transmitting the frame after transmitting "frame #7" (e.g., block 408 illustrates). After a random period of time gap (e.g., the arrow sign G1 illustrates), the host 10 replays the frame, as frames 410-413 illustrated, starting to transmit from "frame #1" (e.g., block 401 illustrates) after "AFC #" frame (e.g., the aforementioned AFC1, AFC0 frames).

For the UFS device 20A, the transmission corresponding to the NAC frame is completed after receiving good AFC frames.

At the time point t4, the UFS device 20A expects to receive "frame #1". However, the host 10 has transmitted the "frame #7", so it leads to the "sequence number error" of the frame and triggers another NAC frame transmission after the UFS device 20A receives "frame #7". Similarly, "frame #1" and "frame #2" (e.g., blocks 411-412 illustrates) will be discarded by the UFS device 20A due to the error handling being performed.

At the time point t5, the host 10 receives the second NAC from the UFS device 20A, and stops transmitting the frame at the proper cut point. At this time point, the host 10 stops transmitting the frame after transmitting "frame #3" (e.g., block 413 illustrates). After the receiver of the UFS device 20A receives "frame #3", it leads to the sequence number error and triggers another NAC frame transmission and another error handling.

Therefore, the aforementioned NAC frame and the error handling occur repeatedly. Because the time gap of the host 10 replaying the frame may be a random time, in the end, the time gap of the host 10 and the NAC frame transmission of the UFS device 20A may overlap, and both the host 10 and the UFS device 20A can complete error handling according to the way defined by the standard. However, the host 10 and the UFS device 20A require more latency to reach the aforementioned status of error handling. In the worst situation, the situation lasts until the data link (DL) protection timer expires.

Therefore, in order to avoid the host 10 and the UFS device 20A operating in an asymmetry power mode (or asymmetry speed), the situation of repeatedly transmitting the informed signal (e.g., the NAC frame) indicating error occurring may occur, and thus reducing the delay time lead by repeated occurring of the error handling, therefore the present invention provides a control technique of error handling for the interconnection interface. The control technique further sets the additional information that is not disclose in the regulation of the interconnection interface (e.g., the UniPro standard) based on the error handling of the interconnection interface (e.g., the implementation of the error handling of the UniPro standard), which can be called as "error handling status information", to indicate the situation of "negative acknowledgment" and "error handling", and to avoid repeatedly transmitting informed signals (e.g., the NAC frame) indicating error occurring according to the error handling status information. Various embodiments according to the control technique are provided as follows, for example, the following control method for error handling in the controller.

Figure 5A:
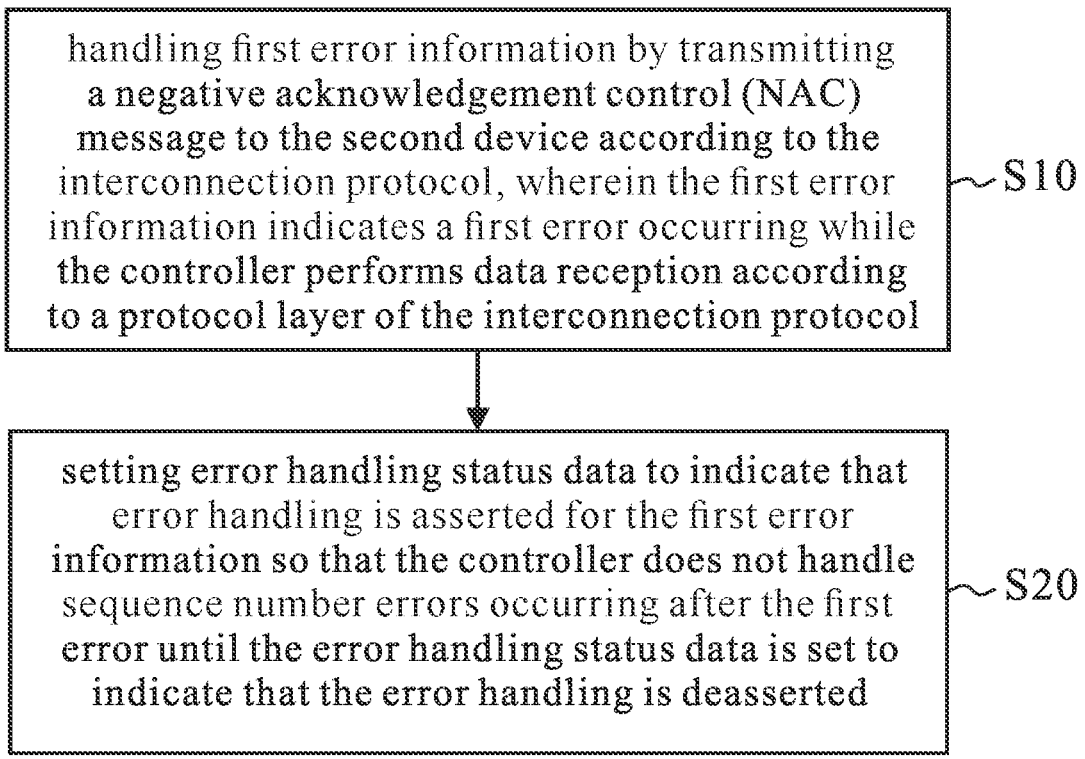
FIG. 5A is a flowchart of an embodiment of a control method for error handling in a controller.

Referring to FIG. 5A, FIG. 5A is a flowchart of an embodiment of the control method for error handling in the controller. The controller for use in a first device is capable of linking a second device according to an interconnection protocol (e.g., the UFS standard). Take the interconnection protocol as the UFS standard as an example, the controller can be the host controller 13 of the host 10 or the memory controller 21 of the storage device 20, and thus implements the UFS system of FIG. 2. The control method includes the following steps:

As illustrated in step S10, through the controller, handling first error information by transmitting a negative acknowledgement control (NAC) message to the second device according to the interconnection protocol, wherein the first error information indicates a first error occurring while the controller performs data reception according to a protocol layer of the interconnection protocol.

As illustrated in step S20, through the controller, setting error handling status data to indicate that error handling is asserted for the first error information so that the controller does not handle sequence number errors occurring after the first error until the error handling status data is set to indicate that the error handling is de-asserted.

As illustrated in FIG. 5B, in some embodiments of the control method, the method further includes: as illustrated in step S30, discarding second error information indicating a sequence number error according to the error handling status data indicating that error handling is asserted so that the controller transmits no NAC message due to the second error information.

As illustrated in FIG. 5C, in some embodiments of the control method, the method further includes: as illustrated in step S40, setting the error handling status data to indicate that the error handling is de-asserted when a data message is received to resolve the first error.

For example, in step S20, the error handling status information can be implemented by using control flags, any proper data structures, or electric signals. In the following explanation and related drawings, the error handling status information is explained by the control flag and the signal nac_error_handling.

According to an example of step S20, when any part of the host 10 and the UFS device 20A faces new error (e.g., the first error), the part finding the error (e.g., the UFS device 20A) set the control flag nac_error_handling as the first numerical value (e.g., logic 1, other numerical value, or data) to represent "negative acknowledgement" and "error handling" are in function. The part finding the error (e.g., the UFS device 20A) makes the control flag nac_error_handling maintain in the first numerical value until the part finding the error (e.g., the UFS device 20A) receives the good frame, setting the control flag nac_error_handling as a second numerical value (e.g., logic 0, other numerical value or data) to represent "negative acknowledgement" and "error handling" are not in function. Wherein the good frame, for example, the data link (DL) traffic class (TC) frame, the DL TC frame indicates the sequence number of the frame meets the expectation, which means the error data message can be solved. When the control flag nac_error_handling represents "negative acknowledgement" and "error handling" are in function, the part finding the error (e.g., the UFS device 20A) does not perform additional NAC frame transmission.

Figure 6:
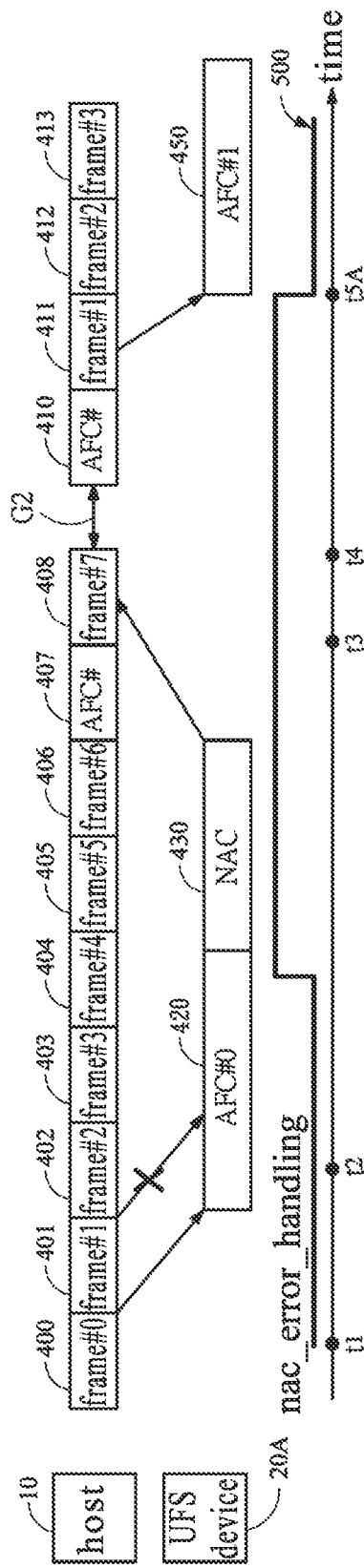
FIG. 6 is a schematic diagram of an embodiment of a control method for error handling in a controller.

As illustrated in FIG. 6, FIG. 6 is a schematic diagram of the application of the control method for error handling in the controller. In FIG. 6, the host 10 and the UFS device 20A is similar to the example of FIG. 4, operating in an asymmetry power mode (or asymmetry speed), the host 10 transmits the frame illustrated in blocks 400-413, which is the same as what is illustrated in the FIG. 4. The difference between FIG. 6 and FIG. 4 is that, in FIG. 6, the host 10 and the UFS device 20A implement the control method according to FIG. 5A.

As illustrated in FIG. 6, at the time point t1, the host 10 starts transmitting the DL frame, for example, the frame starts from the sequence number 0, so block 400 in FIG. 6 represents "frame #0".

At the time point t2, due to some reason, "frame #1" (e.g., block 401 illustrates) is damaged (indicated through a crossing sign below block 401), and lead to the UFS device 20A to face Protocol Data Unit (PDU) error.

Then, according to step S10 of FIG. 5A, the UFS device 20A starts to perform the NAC frame transmission, for example, the NAC frame indicated as block 430, to perform error handling. According to step S20 of FIG. 5A, the UFS device 20A (e.g., the UIC layer 230) asserts control flag nac_error_handling (e.g., setting as logic 1), for example, mode 500 illustrated in FIG. 6 indicates the variation of the control flag nac_error_handling, changing from logic 0 to logic 1. And then, the UFS device 20A (e.g., the UniPro layer 130) neglects the sequence number error according to the asserted control flag nac_error_handling and are not handled, and thus suppresses the following sequence number error. Meanwhile, the host 10 continues to transmit frames due to the sub-link SL1 being faster. Because the UFS device 20A is performing error handling, "frame #2" to "frame #6" (e.g., blocks 402-406 illustrates) are discarded by the UFS device 20A.

At the time point t3, the host 10 receives the first NAC frame from the UFS device 20A, and stops transmitting the frame at the proper cut point. In this situation, the host 10 stops transmitting the frame after transmitting "frame #7" (e.g., block 408 illustrates). After a random period of time gap (e.g., the arrow sign G2 illustrates), the host 10 replays the frame, as frames 410-413 illustrated, starting to transmit from "frame #1" (e.g., block 401 illustrates) after "AFC #" frame (e.g., the aforementioned AFC1, AFC0 frames).

For the UFS device 20A, the transmission corresponding to the NAC frame is completed after receiving a good AFC frame.

At the time point t4, the UFS device 20A expects to receive "frame #1", wherein the last frame the UFS device received is "frame #0" before the current error handling, if the UFS device 20A can receive the "frame #1" sent due to the replay of the host 10, then it indicates that the correct frame is received, and thus solves the current error, therefore, the UFS device expects to receive "frame #1".

Even if the host 10 transmits "frame #7", "sequence number error" occurs after the UFS device 20A receives "frame #7", but due to the fact that according to step S20 of FIG. 5A, the UFS device 20 is implemented to the control flag nac_error_handling according to the assertion to suppress the sequence number error, and thus in this situation, the sequence number error does not lead to another occurring of the NAC frame transmission. For example, according to step S20 of FIG. 5B, the UFS device 20 can be implemented to the control flag nac_error_handling according to the assertion, discarding the error information indicating sequence number error.

At the time point t5A, the host 10 replays the transmitted frame, which means the frame start from sequence number #1, for example, "frame #1", "frame #2", "frame #3 and so on. The UFS device 20A can receive these frames correctly. After the UFS device 20A receives "frame #1", "frame #1" is found to be the frame expected to be received, and thus solves the current error, therefore, the control flag nac_error_handling is set according to step S40 of FIG. 5C to indicate de-asserting the error handling, as illustrated in the lower part of FIG. 6, the mode 500 indicates the variation of the control flag nac_error_handling, changing from logic 1 to logic 0.

As aforementioned, additional NAC frame transmission does not occur by using the control method based on the illustration of FIG. 5A, and can promote completing error handling in an expected delay, and thus is helpful to improve the effectiveness of error handling of the interconnection interface.

According to the aforementioned control method for error handling in a controller, a controller can further be implemented, the controller for use in a first device capable of linking to a second device according to an interconnection protocol (e.g., the UFS standard). Take the interconnection protocol as the UFS standard as an example, the controller can be the host controller 13 of the host 10 or the memory controller 21 of the storage device 20 in FIG. 1, and thus implements the UFS system of FIG. 2.

Figure 7:
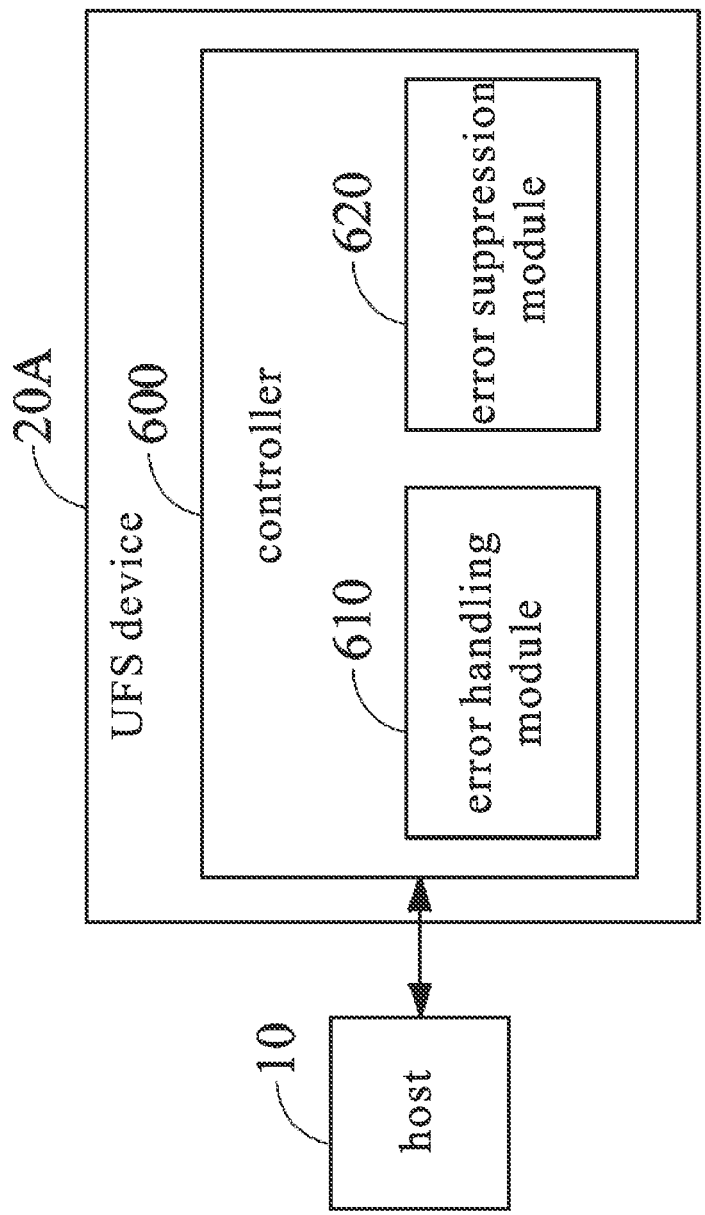
FIG. 7 is a schematic block diagram of an embodiment of a controller for implementing the control method of FIG. 5A.

As illustrated in FIG. 7, taking the UFS system of FIG. 2 as a diagram, the controller 600 of the UFS device 20A includes: an error handling module 610 and an error suppression module 620. The controller 600 can be implemented by the memory controller 21 or the controller 23 in FIG. 1.

The error handling module 610 is configured to handle first error information by transmitting a negative acknowledgement control (NAC) message to the second device (e.g., the host 10) according to the interconnection protocol, wherein the first error information indicates a first error occurring while the controller performs data reception according to a protocol layer of the interconnection protocol.

The error suppression module 620 is configured to set error handling status data to indicate that error handling is asserted for the first error information so that the controller does not handle sequence number errors occurring after the first error until the error handling status data is set to indicate that the error handling is de-asserted.

The aforementioned embodiment of FIG. 7 can also implement examples as described in FIG. 5A to FIG. 5C or the related examples. Correspondingly, the host controller 13 of the host 10 can also be implemented according to FIG. 7 to reach the corresponding action.

Figure 8:
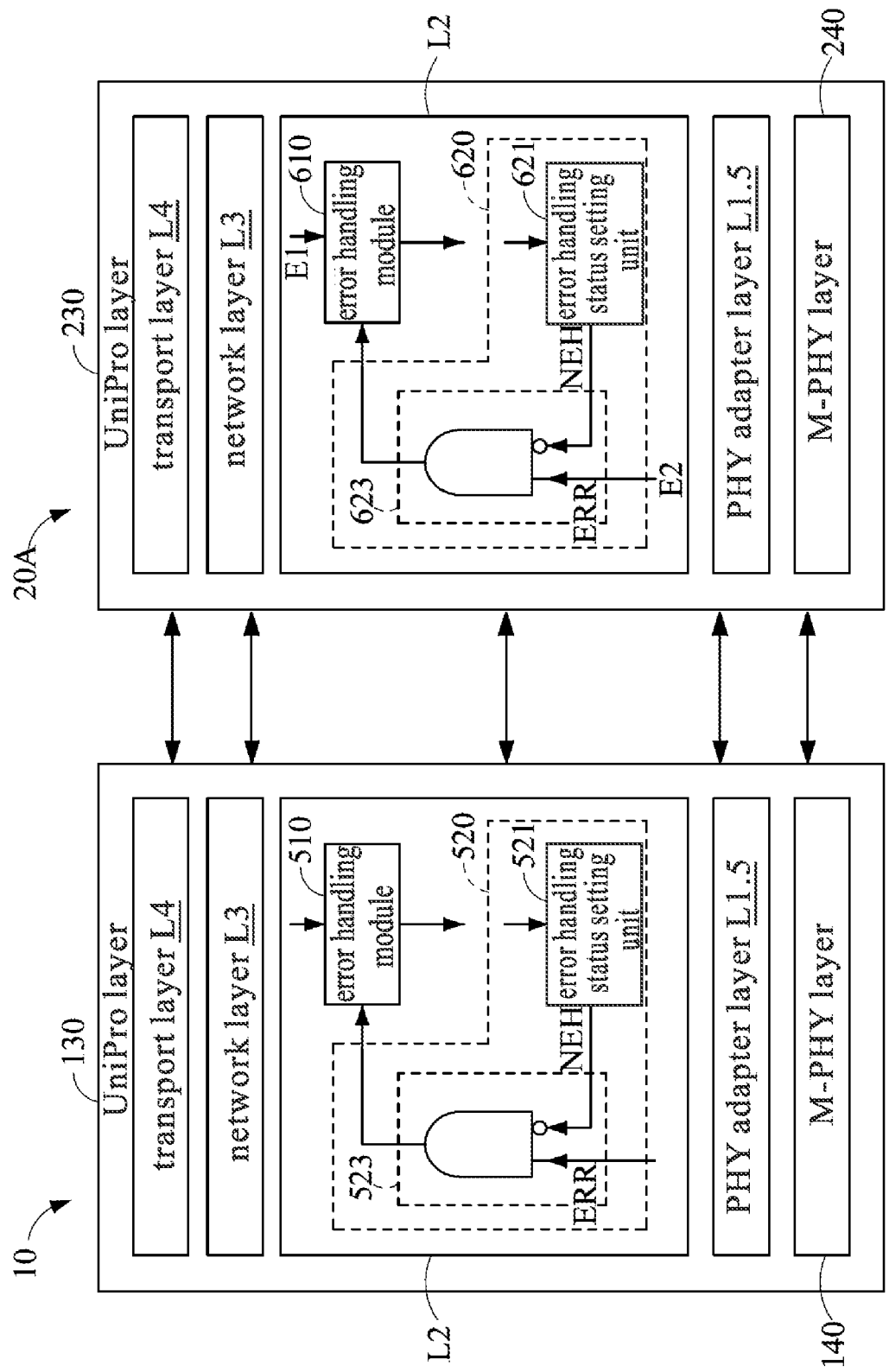
FIG. 8 is a schematic diagram of a hierarchical architecture of the UFS system implemented by the controller according to FIG. 7.

Referring to FIG. 8, FIG. 8 is the schematic diagram of the hierarchical architecture of the UFS system implemented by the controller according to FIG. 7. As illustrated in FIG. 8, the control method is implemented as illustrated in FIG. 5A in the UFS device 20A (or the host 10) according to the implementation of the UniPro standard.

For example, implementing error handling module 610 of data link layer L2 in the controller (e.g., the memory controller 21 or the controller 23) of the UFS device 20A according to UniPro layer 230 is used to handle error messages and thus performs NAC transmission control, and further implements error suppression module 620.

The error handling module 610 transmits a Negative Acknowledgment Control (NAC) message to the host to handle a first error information E1 according to the interconnection protocol, wherein the first error information E1 indicates a first error occurring while the controller performs data reception according to the protocol layer of the interconnection protocol.

For example, the error suppression module 620 can further include error handling status setting unit 621 and suppress sequence number error unit 623.

The error handling status setting unit 621 is configured to set error handling status data (e.g., assert control flag nac_error_handling) to indicate asserting error handling to the first error information E1, and make the controller (e.g., the memory controller 21 or the controller 23) not handle the occurring of the sequence number error after the first error (e.g., PDU error illustrated in FIG. 6). The error handling status setting unit 621 is configured to set the error handling status data to indicate that the error handling is de-asserted (e.g., de-assert controlling flag nac_error_handling) when the controller receives the data message of the first error (e.g., the expected frame #1 illustrated in FIG. 6) is received.

The suppress sequence number error unit 623 is configured to discard second error information E2 indicating the sequence number error according to the error handling status data indicating that error handling is asserted so that the controller transmits no NAC message due to the second error information E2. As illustrated in FIG. 8, the suppress sequence number error unit 623 can be implemented as "discarding" the second error information E2 indicating the sequence number error according to the input error information (the second error information E2) and the error handling status data (the control flag nac_error_handling). For example, based on the logic "AND" calculation, for example, the calculation of ERR·NEH', wherein ERR represents the value (e.g., logic value) of the input error information (e.g., the second error information E2), when the input error information has sequence number error, ERR is 1, when the input error information does not have sequence number error, ERR is 0; NEH represents the value (e.g., the logic value) of the control flag nac_error_handling, when it is asserted, NEH is 1, when it is not asserted, NEH is 0 (in another example, control flag nac_error_handling can also be set as 0 indicating asserted, set as 1 indicating de-asserted). And thus, the suppress sequence number error unit 623 can be implemented according to the input error information (the second error information E2) and the error handling status data (the asserted control flag nac_error_handling) and get the result of logic 0 through the calculation of ERR·NEH', the suppress sequence number error unit 623 can set the input error information (e.g., the second error information E2) as invalid to discard the second error information E2 according to the result, and make the second error information E2 not input to the error suppression module 620, thus suppresses the second error information E2. From another perspective, when the control flag nac_error_handling is de-asserted, the calculation of ERR·NEH' get the result of logic 1, the suppress sequence number error unit 623 can set the input error information (e.g., the second error information E2) as valid according to the result, and thus let the second error information E2 input to the error suppression module 620, and thus the error suppression module 620 performs the second error information E2 according to the interconnection protocol (e.g., the UFS standard), performing the NAC message transmission. In addition, in some examples, the suppress sequence number error unit 623 can be implemented as other logic calculations to reach similar actions, for example, "ERR'+ NEH'", or other proper logic "AND", "OR", "NOT", "NAND", "NOR", "XOR" or "XNOR" or combinations of calculations, thus the embodiments of the suppress sequence number error unit 623 are not limited to the aforementioned examples.

Correspondingly, implementing error handling module 510 of the data link layer L2 in the controller (e.g., the host controller 11) of the host 10 according to UniPro layer 130 is used to handle error messages and thus performs NAC transmission control, and further implementing error suppression module 520 to implement the aforementioned function of the corresponding module in the UFS device 20A. For example, the error suppression module 520 can further include error handling status setting unit 521 and suppress sequence number error unit 523 to implement the aforementioned function of the corresponding module in the UFS device 20A.

In some embodiments, a storage device (e.g., 20, 20A) is provided, the storage device is capable of linking a host according to an interconnection protocol, the storage includes: a non-volatile memory (e.g., 29) and a memory controller (e.g., 21). The memory controller, coupled to the non-volatile memory, for controlling data access to the non-volatile memory, wherein the memory controller is configured to perform a plurality of operations, the operations include the operation corresponding to steps S10-S20 in the control method of FIG. 5A. In some embodiments, the storage device can further be configured to be programmed to implement at least one or a combination based on the embodiments of the methods of FIG. 5A. The storage device can be implemented as the SSD, UFS, eMMC, or any other suitable storage device or products based on the storage device.

In addition, in aforementioned embodiments (e.g., FIG. 1, FIG. 2, FIG. 3, or related drawings, embodiments) of the host and the storage device, at least one or a combination of the host controller 13, memory controller 21 (or controller 23), UIC layer (or PHY adapter layer L1.5, data link layer L2, network layer L3, and transport layer L4) and the MIPI physical layer can be implemented through one or more circuit, for example, microcontroller, processor, or digital signal processor. Or it can be designed based on the use of hardware description language (HDL) or any other design method of the digital circuit familiarized by the technical person in the art, and can be implemented based on one or more circuits, for example, field programmable gate array (FPGA), application specific integrated circuit (ASIC), or CPLD, it can also be implemented by using dedicated circuit or module. However, the implementation of the present disclosure is not limited to these examples. In addition, aforementioned examples illustrated in steps S10-S20, FIG. 5B to FIG. 5C, or FIG. 8 can also be implemented through a hardware circuit, for example, be implemented through a logic circuit or other proper digital circuits.

In addition, in some embodiments, a non-transient storage medium is provided, it stores to let a computing device (e.g., the storage device illustrated in FIG. 1 or FIG. 2) to perform program code of the control method for error handling in the controller through the memory controller (or the controller) in the storage device, wherein the method includes any of the embodiments or a combination according to the method of FIG. 5A. For example, program code is one or more program or program modules, for example, implementing examples illustrated in steps S10-S20 of FIG. 5A, FIG. 5B to FIG. 5C, or FIG. 8, the program code of these modules work together, and can be performed through any proper sequence or in parallel. When the computing device executes the program code, it can lead to an embodiment performed by the computing device based on the control method for error handling in the controller in FIG. 5A. The aforementioned readable storage medium can be, for example, firmware, ROM, RAM, memory card, optical information storage medium, magnetic information storage medium or storage medium or memory in any other type, and the implementation of the present disclosure is not limited to these example.

Thus, the aforementioned embodiments provide a control technique of error handling for the interconnection interface, various embodiments are provided according to the control technique, for example, the control method for error handling in a controller, storage medium therefor, controller, and storage device. Wherein in the process of the error handling of the interconnection interface, error handling status information is set, and avoids the delay due to transmitting the informed signals indicating error occurring repeatedly according to the error handling status information, and is thus helpful to improve the effectiveness of error handling of the interconnection interface.

The present disclosure has been disclosed above in preferred embodiments, but those skilled in the art should understand that embodiments are only used to describe the present disclosure, and should not be construed as limiting the scope of the present disclosure. It should be noted that all changes and substitutions equivalent to embodiments should be included in the scope of the present disclosure. Therefore, the protection scope of the present disclosure should be defined in the claims.

What is claimed is:

1. A control method for error handling in a controller, the controller for use in a first device capable of linking to a second device according to an interconnection protocol, the control method comprising:
   handling first error information by transmitting a negative acknowledgement control (NAC) message to the second device according to the interconnection protocol, wherein the first error information indicates a first error occurring while the controller performs data reception according to a protocol layer of the interconnection protocol; and
   setting error handling status data to indicate that error handling is asserted for the first error information so that the controller does not handle sequence number errors occurring after the first error until the error handling status data is set to indicate that the error handling is de-asserted.

2. The control method according to claim 1, wherein the method further comprises:
   discarding second error information indicating a sequence number error according to the error handling status data indicating that error handling is asserted so that the controller transmits no NAC message due to the second error information.

3. The control method according to claim 1, wherein the method further comprises:
   setting the error handling status data to indicate that the error handling is de-asserted when a data message is received to resolve the first error.

4. The control method according to claim 1, wherein the protocol layer is a Universal Flash Storage InterConnect (UIC) layer.

5. The control method according to claim 1, wherein the first device is a storage device according to Universal Flash Storage standard.

6. The control method according to claim 5, wherein the first device is configured to communicate with the second device in an asymmetry power mode.

7. A non-transitory storage medium, which stores program instructions that are capable of causing a storage device to perform the control method for error handling according to claim 1.

8. A controller, the controller for use in a first device capable of linking to a second device according to an interconnection protocol, the controller comprising:
   an error handling module configured to handle first error information by transmitting a negative acknowledgement control (NAC) message to the second device according to the interconnection protocol, wherein the first error information indicates a first error occurring while the controller performs data reception according to a protocol layer of the interconnection protocol; and
   an error suppression module configured to set error handling status data to indicate that error handling is asserted for the first error information so that the controller does not handle sequence number errors occurring after the first error until the error handling status data is set to indicate that the error handling is de-asserted.

9. The controller according to claim 8, wherein the error suppression module is further configured to discard second error information indicating a sequence number error according to the error handling status data indicating that the error handling is asserted so that the error handling module transmits no NAC message due to the second error information.

10. The controller according to claim 8, wherein the error suppression module is further configured to set the error handling status data to indicate that the error handling is de-asserted when a data message that resolves the first error is received.

11. The controller according to claim 8, wherein the protocol layer is a Universal Flash Storage InterConnect (UIC) layer.

12. The controller according to claim 8, wherein the first device is a storage device according to Universal Flash Storage standard.

13. The controller according to claim 12, wherein the first device is configured to communicate with the second device in an asymmetry power mode.

14. A storage device, capable of linking a host according to an interconnection protocol, the storage device comprising:
   a non-volatile memory; and
   a memory controller, coupled to the non-volatile memory, for controlling data access to the non-volatile memory, wherein the memory controller is configured to perform a plurality of operations comprising:
   handling first error information by transmitting a negative acknowledgement control (NAC) message to the host according to the interconnection protocol, wherein the first error information indicates a first error occurring while the memory controller performs data reception according to a protocol layer of the interconnection protocol; and
   setting error handling status data to indicate that error handling is asserted for the first error information so that the memory controller does not handle sequence number errors occurring after the first error until the error handling status data is set to indicate that the error handling is de-asserted.

15. The storage device according to claim 14, wherein the memory controller is configured to further perform:
   discarding second error information indicating a sequence number error according to the error handling status data indicating that the error handling is asserted so that the memory controller transmits no NAC message due to the second error information.

16. The storage device according to claim 14, wherein the memory controller is configured to further perform:
   setting the error handling status data to indicate that the error handling is de-asserted when a data message that resolves the first error is received.

17. The storage device according to claim 14, wherein the protocol layer is a Universal Flash Storage InterConnect (UIC) layer.

18. The storage device according to claim 14, wherein the storage device is compliant with Universal Flash Storage standard.

\* \* \* \* \*